Feb. 5, 1963
Z. A. ZACK
3,076,278
ILLUMINATED DISPLAY DEVICE
Filed July 6, 1959
5 Sheets-Sheet 1
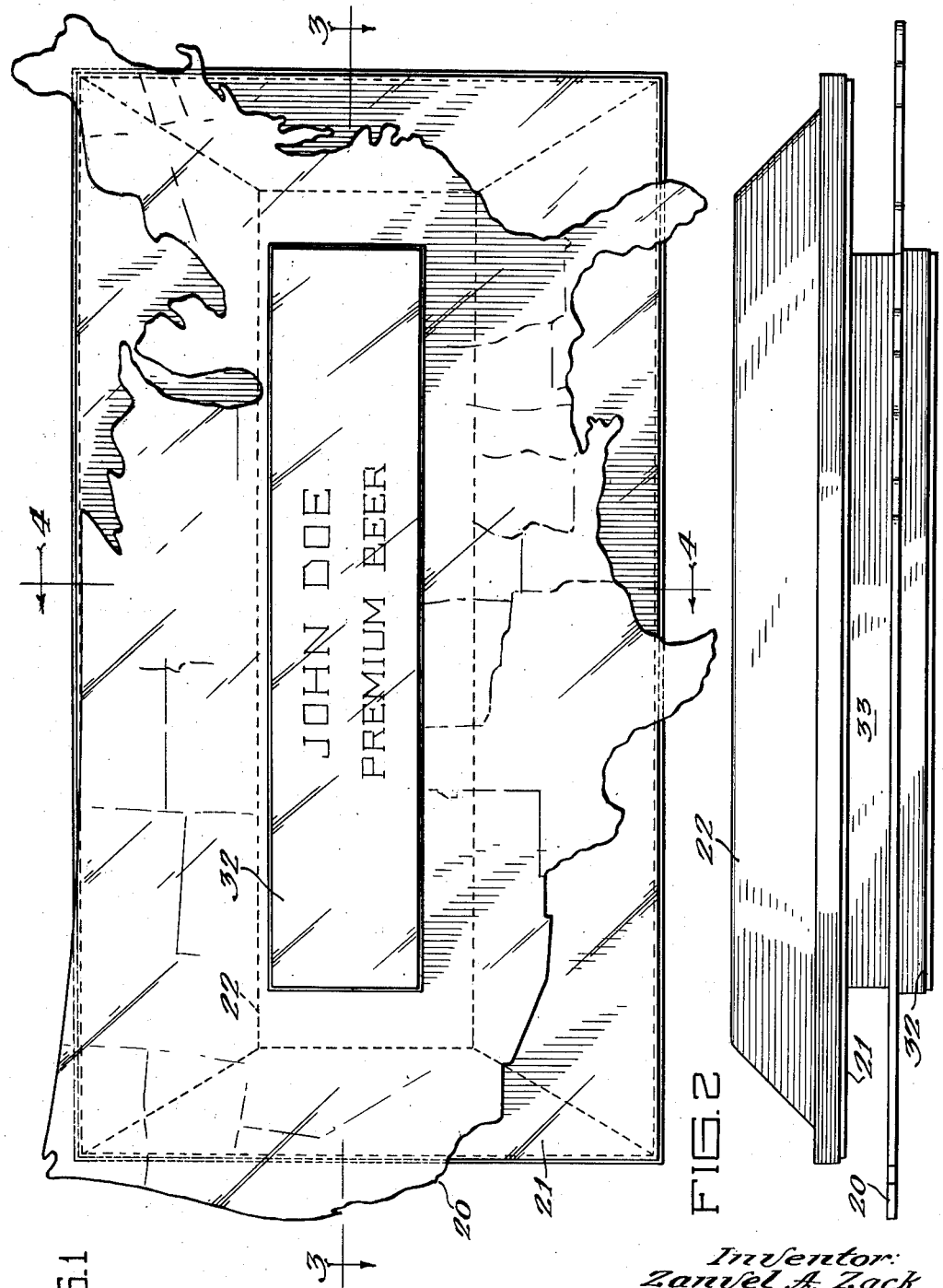
Inventor:
Zanvel A. Zack
By: Hofgren, Brady, Wegner,
Allen & Stellman
Attorneys

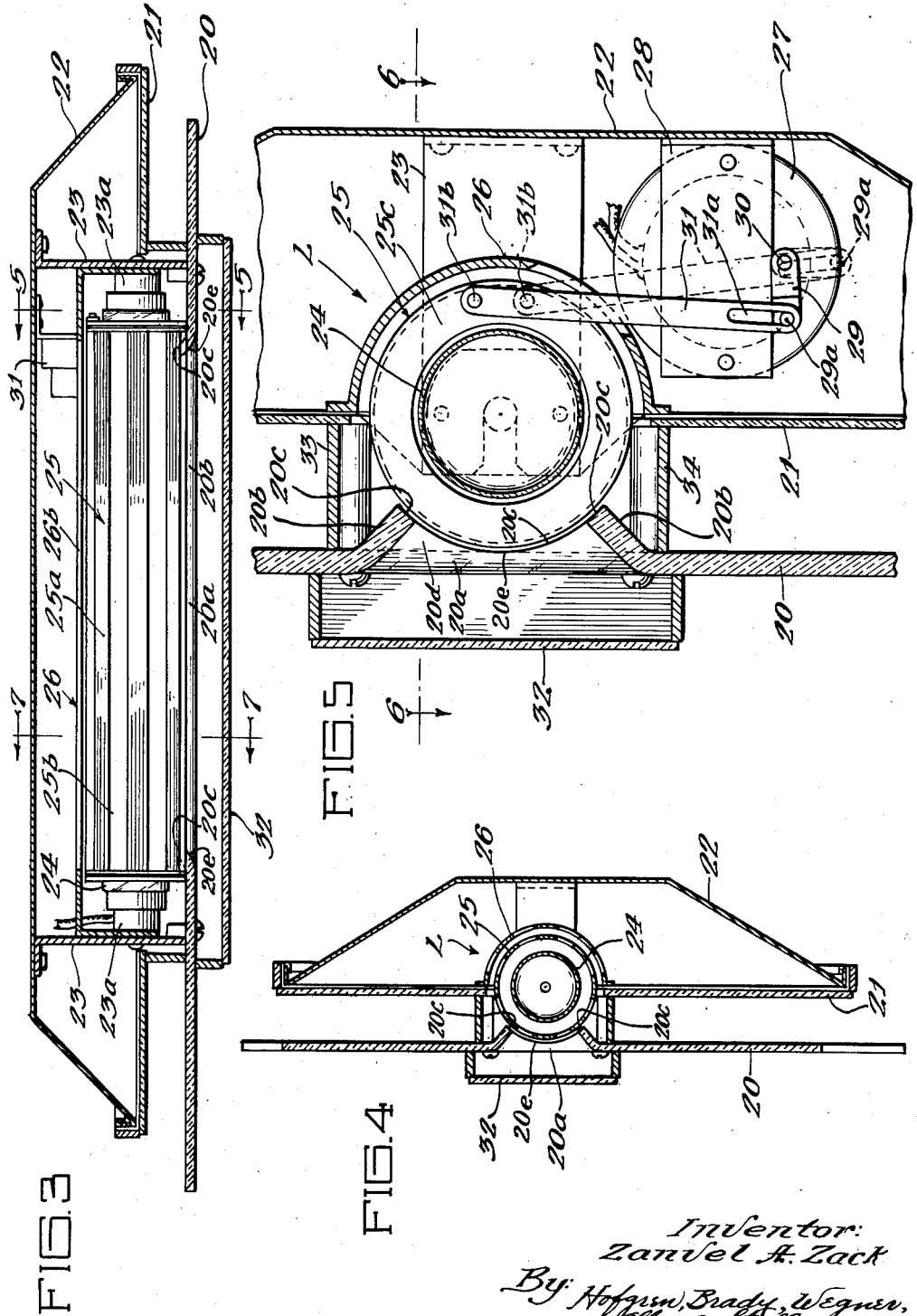

Feb. 5, 1963 Z. A. ZACK 3,076,278
ILLUMINATED DISPLAY DEVICE
Filed July 6, 1959 5 Sheets-Sheet 3

Inventor:
Zanvel A. Zack
By: Hofgren, Brady, Wegner,
Allen & Stellman
Attorneys

Feb. 5, 1963   Z. A. ZACK   3,076,278
ILLUMINATED DISPLAY DEVICE
Filed July 6, 1959   5 Sheets-Sheet 4
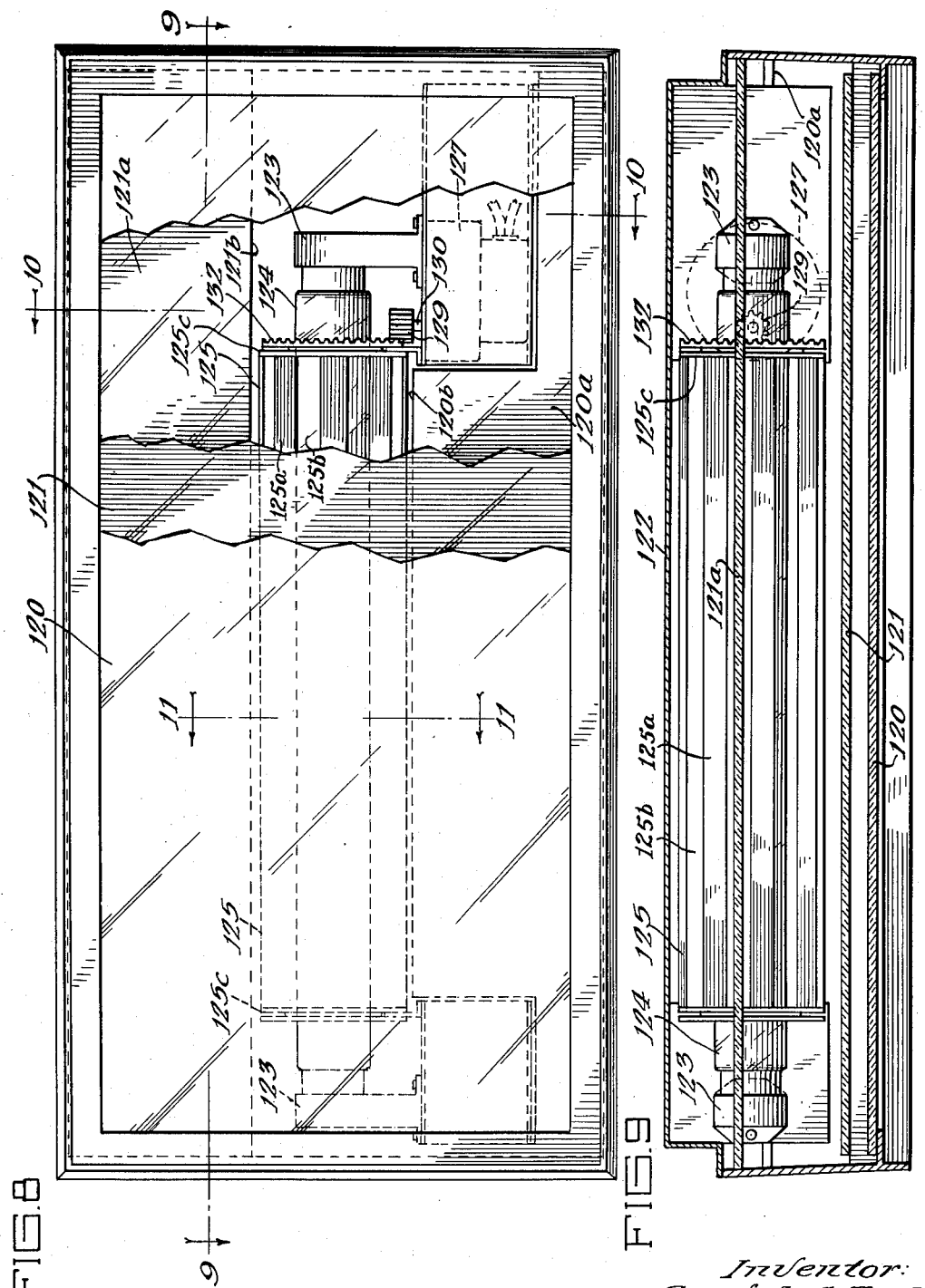
Inventor:
Zanvel A. Zack
By: Hofgren, Brady, Wegner,
Allen & Stellman
Attorneys.

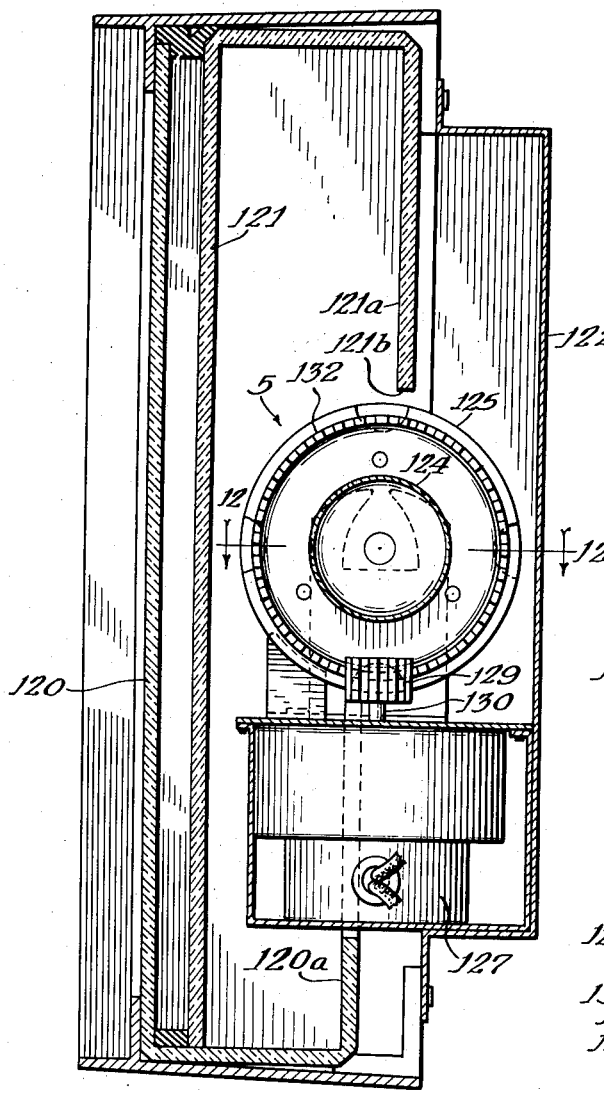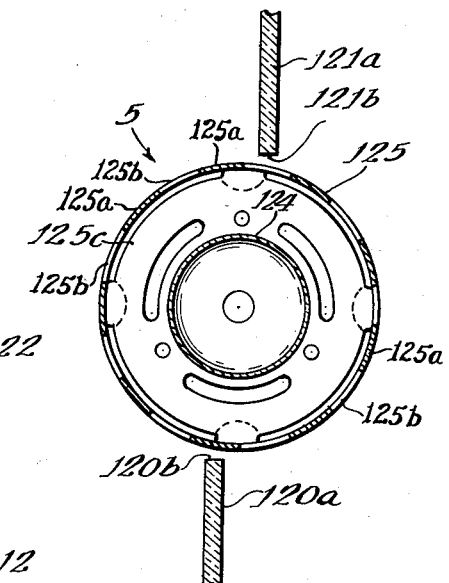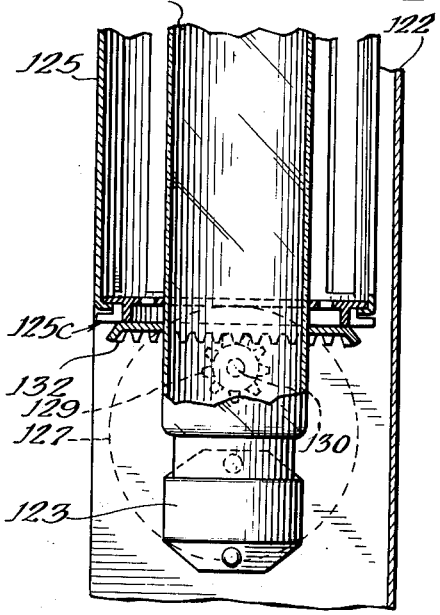

United States Patent Office 3,076,278
Patented Feb. 5, 1963

3,076,278
ILLUMINATED DISPLAY DEVICE
Zanvel A. Zack, Libertyville, Ill., assignor to Thomas A. Schutz Co. Inc., a corporation of Delaware
Filed July 6, 1959, Ser. No. 825,048
12 Claims. (Cl. 40—130)

This invention relates to an illuminated display device, and more particularly to a display device in which each of the display elements may be alternately illuminated in a manner to present a novel eye-catching effect.

Display devices have gained in popularity as an advertising medium, and as a result have become quite common in retail establishments such as stores, cocktail lounges and the like. The advertising value of displays is reduced when they become so common that they no longer attract and hold the attention of prospective purchasers. The present invention is designed to overcome the monotony of such display devices.

A primary object of this invention is to provide a new and improved illuminated display device.

Another object is to provide a display device wherein each of the display elements is adapted for illumination and means are provided to shift the illumination from one element to another to give a novel, eye-catching effect.

A further object is to provide a display device wherein at least one of the display elements is adapted for edge illumination and means is provided to shift the illumination from one display element to another. This may be used to produce successive sharp changes in the appearance of the device, or to give a visual effect of motion.

Other objects will be in part obvious and in part pointed out more in detail hereinafter.

The invention is illustrated in a preferred and an alternative embodiment in the accompanying drawings, in which:

FIG. 1 is a front elevational view of a preferred embodiment of an illuminated display device;

FIG. 2 is a top plan view of the device shown in FIG. 1;

FIG. 3 is a sectional view taken substantially as illustrated along the line 3—3 of FIG. 1, showing the light source and shutter apparatus in the display device;

FIG. 4 is a sectional view taken substantially as illustrated along the line 4—4 of FIG. 1;

FIG. 5 is an enlarged fragmentary sectional view taken substantially as illustrated along the line 5—5 of FIG. 3;

FIG. 8 is a front elevational view of an alternative embodiment of an illuminated display device;

FIG. 9 is a sectional view taken substantially as illustrated along the line 9—9 of FIG. 8;

FIG. 10 is an enlarged sectional view taken substantially as illustrated along the line 10—10 of FIG. 8;

FIG. 11 is an enlarged fragmentary sectional view taken substantially as illustrated along the line 11—11 of FIG. 8; and FIG. 12 is a fragmentary sectional view taken substantially as illustrated along the line 12—12 of FIG. 10.

Figure 6:
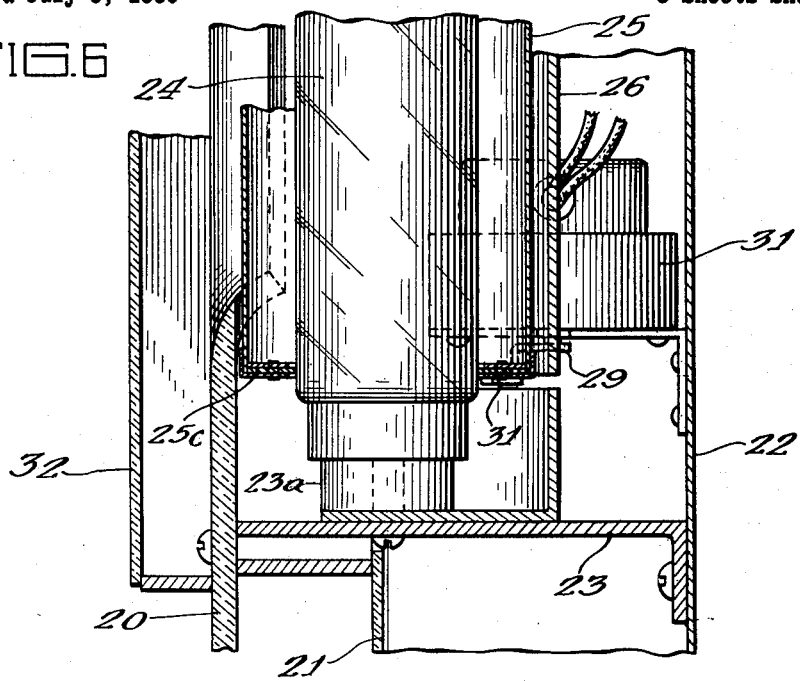
FIG. 6 is a fragmentary sectional view taken substantially as illustrated along the line 6—6 of FIG. 5.

Referring to the drawings in greater detail, and referring first to the preferred embodiment of the display device shown in FIGS. 1 through 7, a first display element 20 is mounted in front of a second display element 21 which in turn is mounted in front of a mounting frame and pan-shaped reflector 22. A light source and shutter apparatus, generally shown as L, is mounted within the display device to shift illumination alternately from the first display element to the second display element as will be described in detail hereinafter.

As best seen in FIG. 3, the first display element 20, preferably a transparent sheet of plastic or glass having refractory properties for edge illumination, is fastened to a pair of forwardly extending brackets 23 which are mounted on reflector 22. The first display element is shown as an outline of the United States, with the state boundaries etched; but may be of any other desired configuration to attract attention. The central portion of display element 20 is provided with a rectangular opening 20a, and the edges of the opening are bent inwardly in such a way that every segment of each edge is generally parallel to the surface of a tubular artificial light source 24 mounted in sockets 23a on brackets 23. When the edges of opening 20a are exposed, the light source 24 imparts an edge illumination to the first display element so that the state boundaries appear as brilliant lines of light against a relatively dark background.

In order that the edges of rectangular opening 20a may be generally parallel to the surface of a tube, and the end edges of the rectangle may be edge illuminated by the tube to impart light to those parts of the display element which flank the ends of the tube, it is necessary for the edge portions of the opening to have a particular shape which is best seen in FIGS. 3 to 6. The longitudinal portions 20b adjacent the opening are bent rearwardly so that the longitudinal edges 20c of the opening are substantially normal to radii of tube 24 which subtend an arc of less than 180°. The end portions 20d adjacent the opening are also bent rearwardly, and the end edges 20e are arcs substantially concentric with the tube and in planes normal to its axis. Thus, all parts of the edges of the rectangle are substantially parallel to the surface of the tube.

The second display element 21 is preferably a translucent sheet having a pictorial overlay depicting any suitable background for the first transparent display member 20, such as clouds and sky, desert or water; and is mounted on the leading edges of the pan-shaped reflector 22 generally parallel to and behind the first display element 20. The central portion of second display element 21 has an opening with edges generally confronting light source 24, the edges being blacked out so that the second display element cannot be edge illuminated, but instead is illuminated from the rear by light reflected from reflector 22.

The shutter portion of light and shutter apparatus L is mounted about light source 24 to alternately shift the illumination between the elements 20 and 21. The shutter apparatus comprises a rotatable shutter cylinder 25 surrounding light source 24, and a semi-cylindrical shutter member 26 rigidly mounted between brackets 23 in close concentric relationship to cylinder 25 and with its edges abutting display element 21. Cylinder 25 has alternate opaque and clear longitudinal strips 25a and 25b, while member 26 has matching strips 26a and 26b, so that as the cylinder is rotated its opaque strips 25a are first aligned with the opaque strips 26a and then with the clear strips 26b of member 26 to alternately illuminate and darken reflector 22 and display element 21. For clarity of illustration the cylinder 25 and shutter member 26 are illustrated as having spaced strips defining the opaque areas 25a and 26a; but in practice they could be made of transparent plastic with strips painted on them, or applied in any other way.

Figure 7:
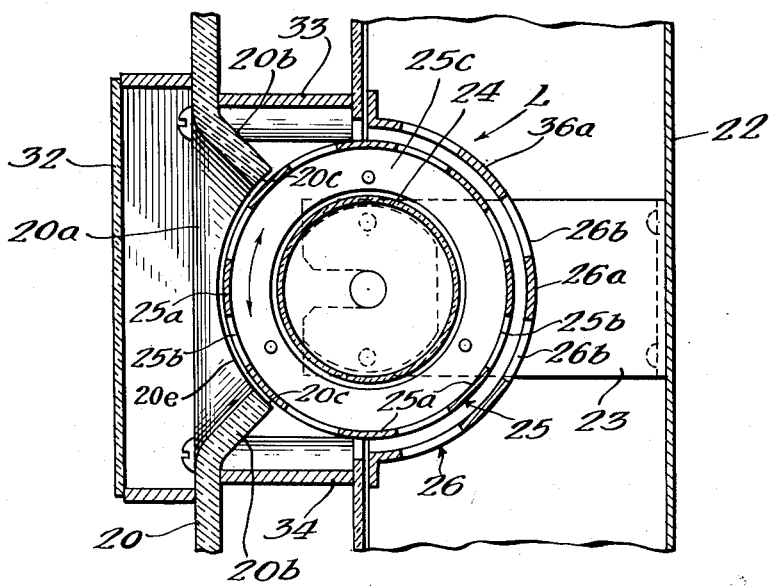
FIG. 7 is an enlarged fragmentary sectional view taken substantially as illustrated along the line 7—7 of FIG. 3.

As best seen in FIGS. 6 and 7, shutter cylinder 25 has annular caps 25c by means of which it is journalled directly upon tube 24.

The opaque strips 25a on shutter cylinder 25 are disposed in relation to edges 20a of display element 20 to confront the edges and thus block out the edge illumination of that element when the second display element 21 is being illuminated as described above. Likewise, when the second display element 21 is dark, the clear strips 25b of shutter 25 confront edges 20a and impart an edge illumination to element 20; thus alternately shifting the illumination from the edge lighted element 20 to the other element 21.

Extending between the two display elements 20 and 21 and connected to brackets 23 are longitudinal top and bottom plates 33 and 34 which cooperate with said brackets to enclose tube 24.

The means for rotating cylinder 25 to alternately shift the illumination from one display element to another comprises a small electric motor 27 mounted on a bracket 28 which in turn is mounted on reflector 22. A crank arm 29 on shaft 30 of motor 27 has a pin 29a riding in a slot 31a of a drive link which is pivotally connected at 31b to an end of shutter cylinder 25; so that operation of the motor oscillates the cylinder about its longitudinal axis and thus alternately shifts the illumination between elements 20 and 21.

A projecting face plate 32, preferably translucent and adapted to carry advertising copy, is attached to the front of display element 20 covering the openings in elements 20 and 21 and the shutter apparatus.

The alternative embodiment of the display device is shown in FIGS. 8 through 12, and comprises a frame 122 in which is mounted a first display element 120 and a second display element 121 parallel to said first element, each element having refractory properties for edge illumination. As seen in FIGS. 10 and 11, the display element 120 has its lower end turned rearwardly and then upwardly behind element 121 to provide a light transmitting body 120a having an illuminating edge 120b. Similarly, element 121 has its upper portion turned rearwardly and down to provide a light transmitting body 121a having an illuminating edge 121b which is in a plane slightly behind that of edge 120b; and both light transmitting bodies and their illuminating edges are within the confines of frame 122 with the illuminating edges 120b and 121b confronting a light source and shutter apparatus, generally shown as S, for edge illumination.

An artificial light source 124, preferably a straight fluorescent tube, is mounted on a pair of brackets 123 which in turn are mounted on frame 122. A shutter cylinder 125 has anular end caps 125c by which it is journalled directly on tube 124 in the same manner as shutter 24 in the preferred embodiment of the invention. The cylinder is provided with alternate opaque longitudinal strips 125a and clear longitudinal strips 125b, as is the cylinder 25 in the first form of the invention. The strips are so disposed that when the edge 120b is aligned with a transparent strip so that it is illuminated by light source 124, the edge 121b is aligned with an opaque strip 125a, so as to be dark. Thus, rotation of shutter cylinder 125 may shift edge illumination alternately from one display element to the other. Proper placing of designs on the two display elements will give the effect of motion as the illumination is shifted.

Shutter 125 is rotated by a small electric motor 127 having a pinion 129 mounted on a motor shaft 130 and meshing with a face gear 132 mounted on one end cap 125c of shutter 125.

The foregoing detailed description is given for clearness of understanding only and no unnecessary limitations should be understood therefrom, as modifications will be obvious to those skilled in the art.

I claim:

1. In a display device: a first display element having refractory properties for conducting light and having a plurality of edges adapted for edge illumination of said element; a tubular artificial light source confronting all of said plurality of edges; an opaque shutter rotatably mounted about said light source, said shutter having spaced openings; a second fixed opaque shutter mounted concentrically of the first shutter, said second shutter having spaced openings corresponding to the spaced openings of the rotatable shutter; a second display element behind said first element and adapted for surface illumination; and means for moving the rotatable shutter to shift the spaced openings and resultant illumination from one element to the other.

2. A device as specified in claim 1 in which the second display element is light pervious, a reflector is mounted behind said second display element, and said reflector is alternately illuminated through said shutters for illuminating the back surface of the second display element.

3. In a display device: a first display element having properties for edge illumination, said element having an opening therethrough intermediate its sides, said element having a plurality of edges adjacent the opening, said edges adapted for edge illumination of the element; an artificial light source confronting said edges for edge illuminating the element; cover means over said opening to mask the light source; a second display element to the rear of said first element and having a surface positioned to receive illumination from said light source; and means for cyclically shifting the illumination from said light source between said edges of said first element and said surface of said second element.

4. The device of claim 3 in which the light source is a straight tube, the opening in the display element is generally rectangular, and the portions of the element adjacent the longitudinal edges of the opening are turned rearwardly toward the tube so that the longitudinal edges of the opening are normal to radii of said tube which subtend an arc of less than 180° the portions of the display element adjacent the ends of the opening are turned rearwardly, and the end edges of the opening are arcs substantially concentric with the tube and in planes generally normal to its axis.

5. In a display device: a first display element having properties for edge illumination, said element having an opening therethrough intermediate its sides; said element having a plurality of edges adjacent the opening, said edges adapted for edge illumination of the element; an artificial light source confronting said edges for edge illuminating the element; a second display element adapted for surface illumination; an opaque shutter rotatably mounted about said light source, said shutter having spaced openings; and means for rotating the shutter about the light source to shift the spaced openings and resultant illumination from one element to the other 6. In a display device: a first display element having refractory properties for conducting light and having a plurality of edges adapted for edge illumination of said element; a second display element behind said first element and adapted for surface illumination; a single, tubular artificial light source confronting all of said plurality of edges and positioned to illuminate the surface of said second display element; and means for cyclically shifting the illumination between said first and second display elements.

7. The device of claim 6 in which the means for shifting the illumination comprises a mechanical shutter associated with said tube.

8. In a display device: a predominantly transparent forward display element having refractory properties for edge illumination and having an edge adapted for edge illumination, there being a line design on said forward element; a rearward display element to the rear of said first element and adapted for surface illumination, said rearward element having a pictorial design which is visible through said forward element when illuminated; illuminating means for edge illuminating said forward element and for surface illuminating said rearward element; and means for cyclically shifting the illumination from one element to the other, whereby the line design on the forward element and the pictorial design on the rearward element are alternately visible in the same area.

9. The device of claim 8 in which the rearward element is transparent, and the illluminating means includes means for diffusely illuminating the rear surface of said element.

10. The device of claim 8 in which the forward element has a central opening, the illuminating means is positioned to illuminate the edges of said opening, and a cover member over the opening conceals the illuminating means, said cover member being constructed to transmit light in a predetermined pattern.

11. In a display device: a forward display element having refractory properties for edge illumination and having an edge adapted for edge illumination; a single artificial light source confronting said edge for edge illuminating the element; a rearward display element having a surface positioned to receive illumination from said light source; and means for cyclically shifting the illumination from said light source between said edge of said first element and said surface of said second element.

12. In a display device: a first display element having refractory properties for edge illumination and having an edge adapted for edge illumination; a second display element to the rear of said first element and adapted for surface illumination; a reflector behind said second display element; a single artificial light source positioned to illuminate said edge of said first element and said reflector; and means for cyclically shifting the illumination from said light source between said edge and said reflector.

References Cited in the file of this patent

UNITED STATES PATENTS

| | | |
|---|---|---|
| 1,400,296 | Kusel | Dec. 13, 1921 |
| 2,177,641 | Evans | Oct. 31, 1939 |
| 2,517,095 | Dixon | Aug. 1, 1950 |
| 2,588,545 | Lawrence | Mar. 11, 1952 |
| 2,651,863 | Howenstine | Sept. 15, 1953 |
| 2,651,865 | Howenstine | Sept. 15, 1953 |
| 2,722,762 | Krajian | Nov. 8, 1955 |

FOREIGN PATENTS

| | | |
|---|---|---|
| 291,067 | Switzerland | Sept. 1, 1953 |